(No Model.) 4 Sheets—Sheet 2.
W. S. HUBBARD & R. GIBBINS.
MACHINE FOR SORTING PILLS AND OTHER SIMILAR ARTICLES.
No. 450,937. Patented Apr. 21, 1891.
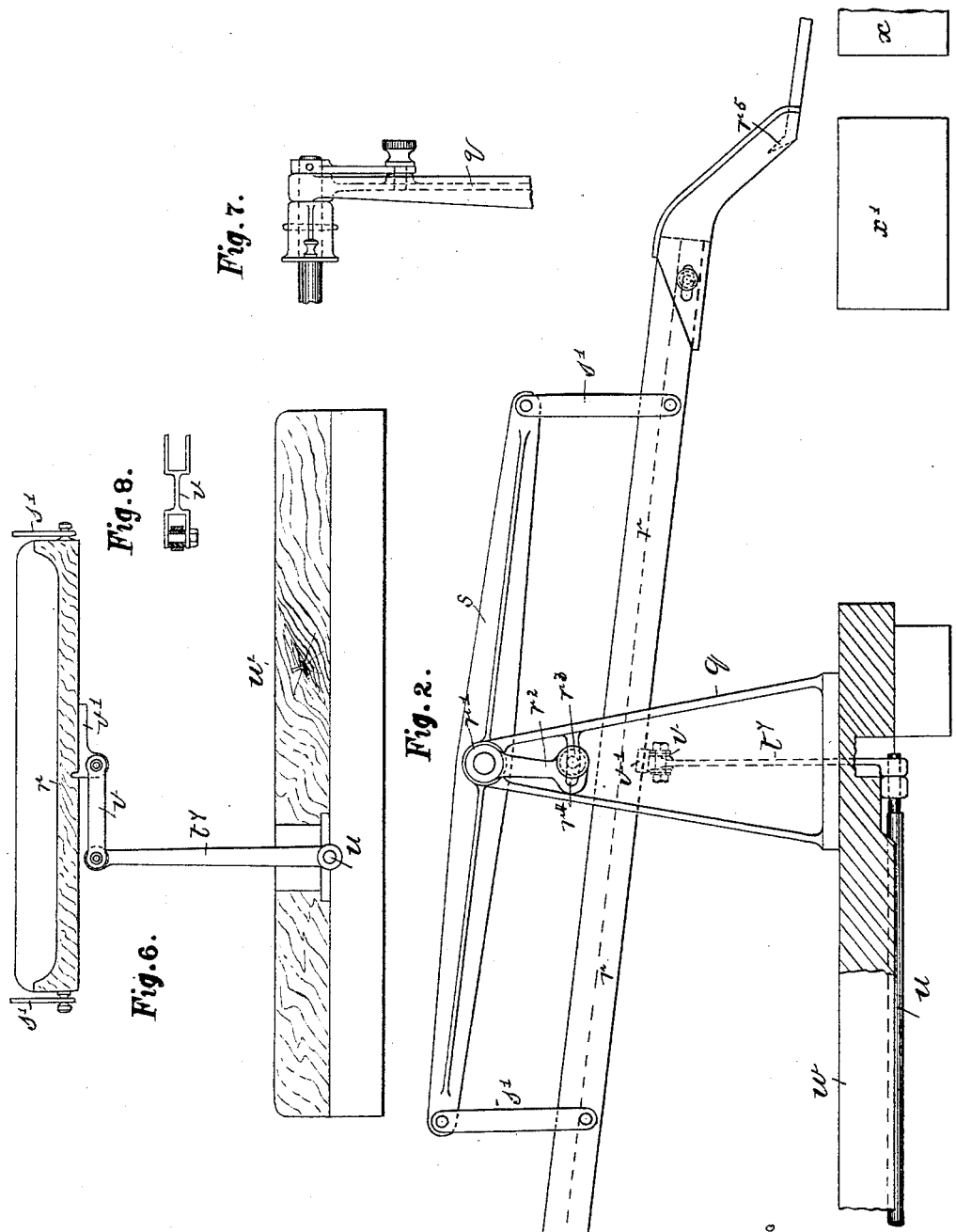
WITNESSES
INVENTORS
W. S. Hubbard
Richard Gibbins
By Connolly Bros
Attys (No Model.) 4 Sheets—Sheet 3.
W. S. HUBBARD & R. GIBBINS.
MACHINE FOR SORTING PILLS AND OTHER SIMILAR ARTICLES.
No. 450,937. Patented Apr. 21, 1891.
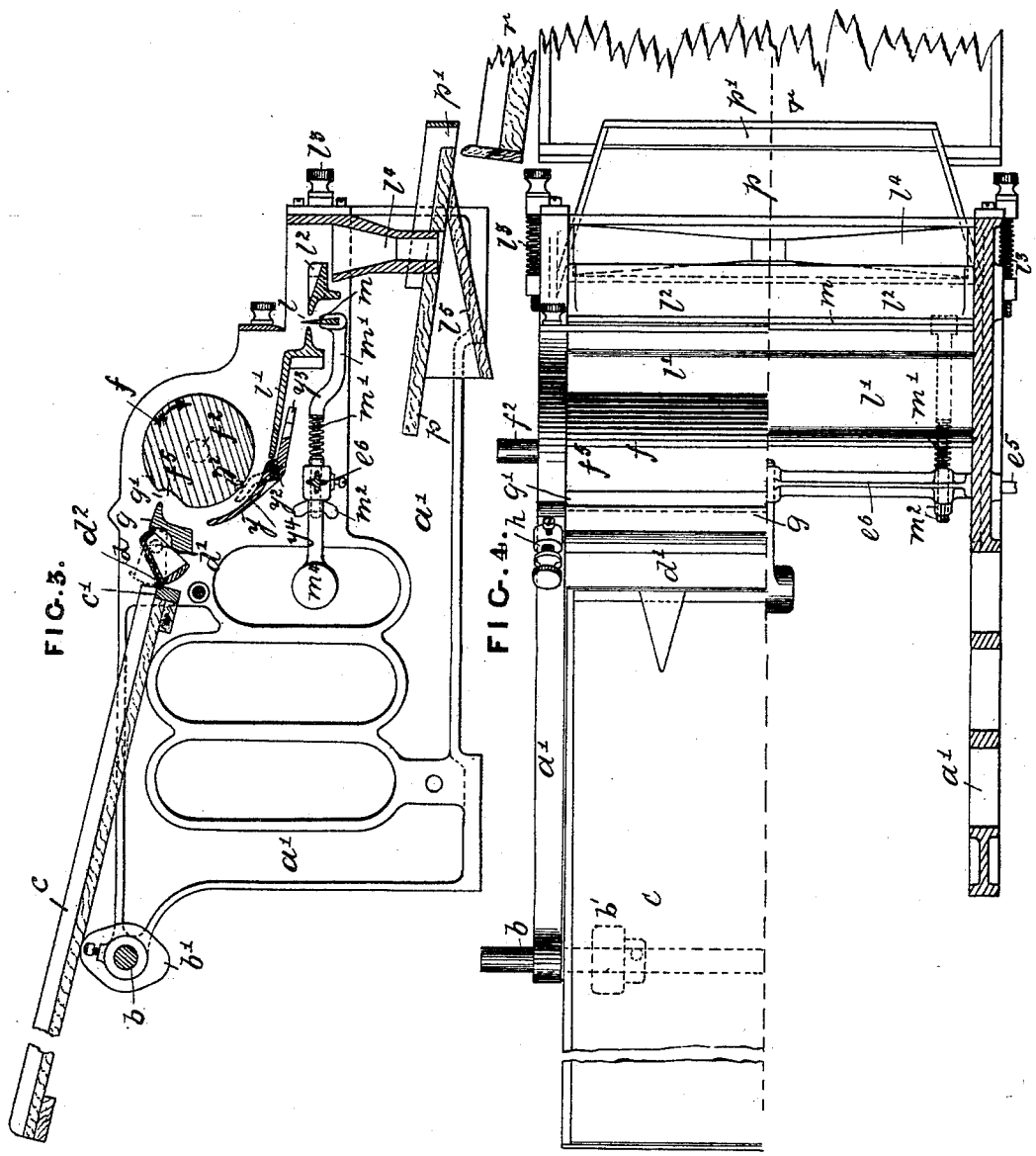

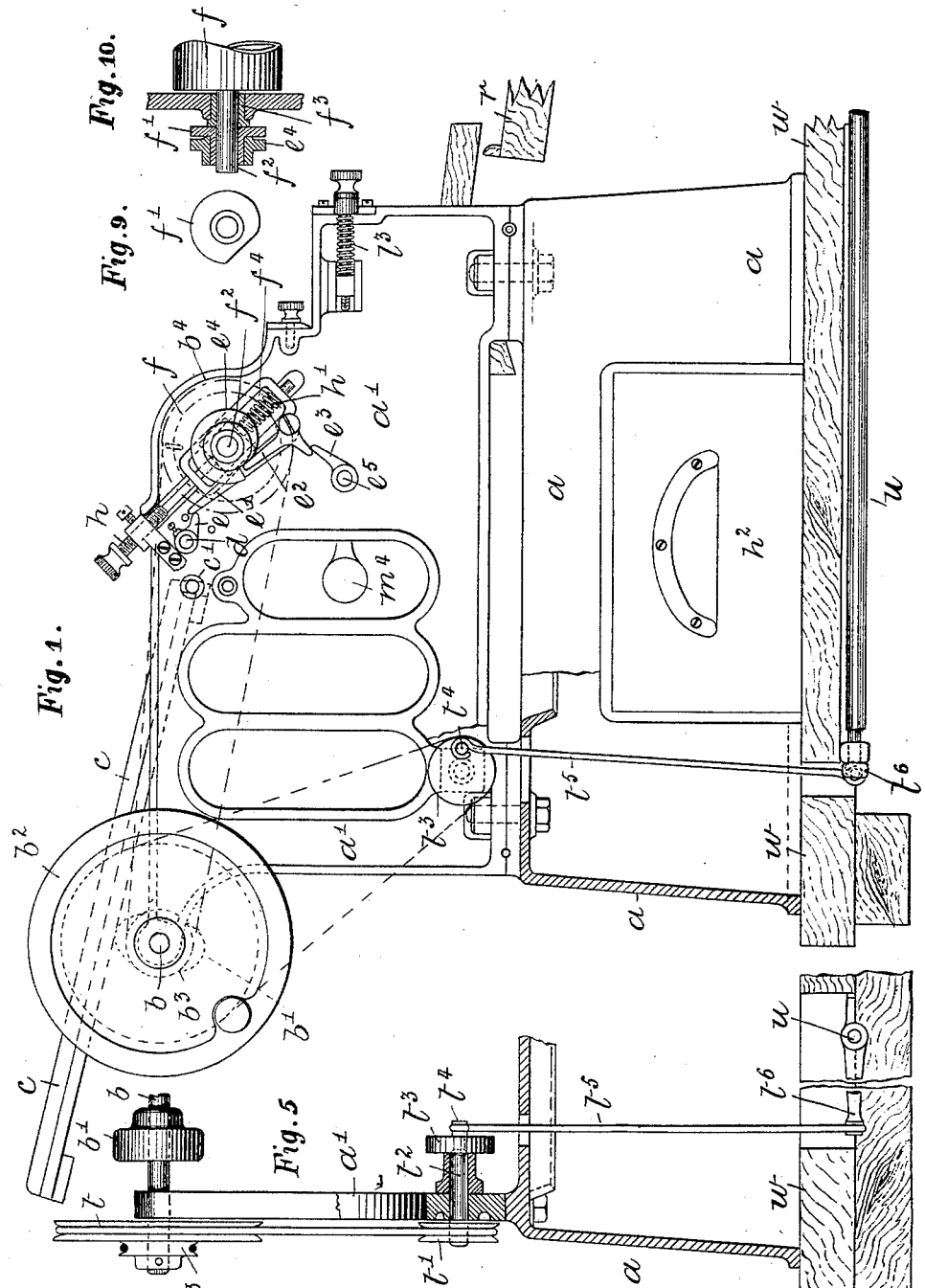

(No Model.) 4 Sheets—Sheet 4.
W. S. HUBBARD & R. GIBBINS.
MACHINE FOR SORTING PILLS AND OTHER SIMILAR ARTICLES.
No. 450,937. Patented Apr. 21, 1891.
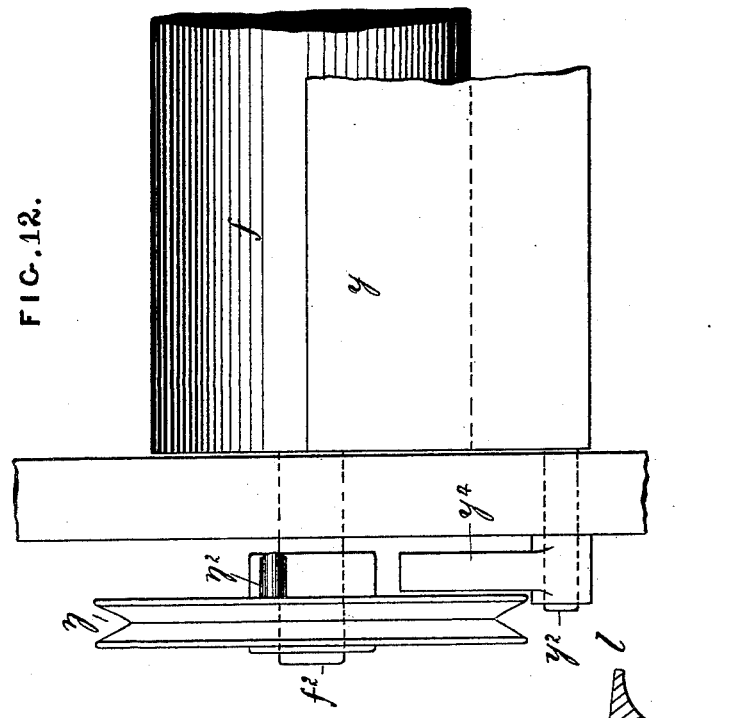
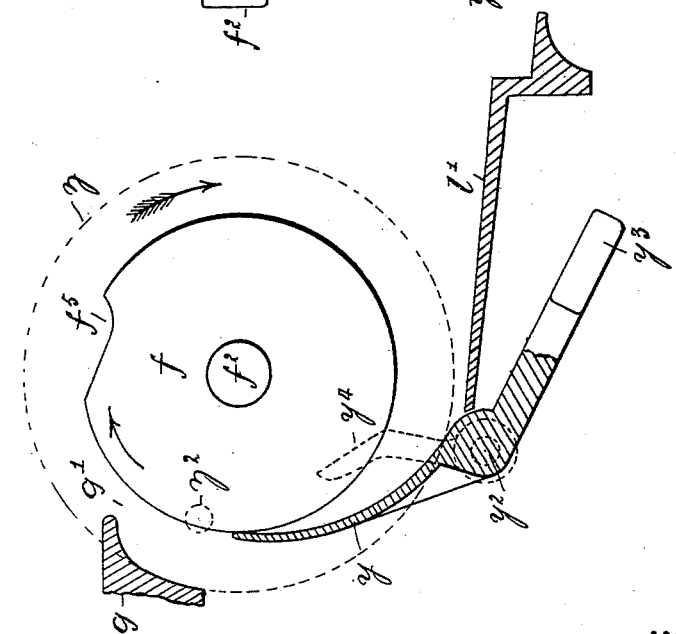

UNITED STATES PATENT OFFICE.

WILLIAM SAMMONS HUBBARD, OF COVENTRY, AND RICHARD GIBBINS, OF LEICESTER, ENGLAND, ASSIGNORS TO SAID HUBBARD AND ALFRED EDWARD HERBERT.

MACHINE FOR SORTING PILLS AND OTHER SIMILAR ARTICLES.

SPECIFICATION forming part of Letters Patent No. 450,937, dated April 21, 1891.

Application filed March 11, 1889. Serial No. 302,930. (No model.) Patented in England September 2, 1887, No. 11,914.

*To all whom it may concern:*

Be it known that we, WILLIAM SAMMONS HUBBARD, engineer, and RICHARD GIBBINS, chemist, subjects of the Queen of Great Britain, the former residing at Queen's Road, Coventry, England, and the latter residing at 36 Evington Road, Leicester, England, have invented a certain new and useful Machine for Sorting Pills and other Similar Articles; that the same has not been patented in any foreign country excepting Great Britain, bearing date the 2d day of September, 1887, and numbered 11,914; and we do hereby declare the following to be a full, clear, and exact description of the invention, reference being had to the accompanying drawings, which form part of this specification.

The object of our invention is to provide a machine for the purpose of sorting pills and other articles, so that those of a required size are separated from others of various sizes and irregular shapes.

In the accompanying drawings, Figure 1 is a side elevation of part of the machine, and Fig. 2 is a side elevation of the vibrating tray, which is placed at the end of and forms a continuation with the parts shown in Fig. 1. Fig. 3 is a longitudinal vertical central section, and Fig. 4 a plan, of the machine, the portion below line being shown in section. Fig. 5 shows the mechanism at the end of the machine for vibrating the tray, of which Fig. 6 is a transverse section. Fig. 7 is a side view of standard. Fig. 8 is a plan of forked link. Fig. 9 is a front view of cam, and Fig. 10 is a sectional detail view showing the manner of mounting. Fig. 11 is a sectional view, and Fig. 12 is a side elevation, on an enlarged scale, of portions of the pill-assorting mechanism.

Like letters refer to the same parts throughout the drawings.

$a$ is the foundation or bed which supports the frame of the machine $a'$, upon which is mounted a shaft $b$, carrying a cam $b'$ for imparting a vibrating motion to an inclined chute $c$, pivotally supported at or near its lower end $c'$ by the frame-work, and upon which are placed the pills or other articles to be sorted.

The shaft $d$ has its bearings in the frame-work and carries near the lower end of the inclined chute $c$ a suitable feeder-bar $d'$, extending across the machine and provided with a ledge $d^2$, onto which the pills roll from the chute $c$. This feeder $d'$ is capable of being alternately raised and lowered by means of a lug $e$, carried on the end of the shaft $d$ and actuated by a tappet-lever $e'$, which receives its motion from a cam $f'$, Fig. 9, fixed on the end of the shaft $f^2$ of the roller $f$, Fig. 10. When the feeder $d'$ is in its lowest position, the front row of pills rolls onto the ledge $d^2$, and when the feeder rises to its highest position it forms an inclined plane with the fixed bar $g$, down which the pills roll into the space or opening $g'$, Fig. 3, formed between the edge of the fixed bar $g$ and the periphery of the revolving roller $f$. The position of this roller is adjustable in relation to the fixed bar $g$ by means of the adjusting-screw $h$ and the spring-actuated rod $h'$, the latter of which may preferably be formed integrally with the bearing of the roller. The space or opening $g'$ is just sufficiently wide to allow the small pills—that is, those under the required size—to fall through into a box $h^2$, Fig. 1, placed underneath for their reception. The adjustable roller $f$ has its bearings in journals $f^3$, capable of moving up and down in the slot $f^4$, and is provided throughout the whole of its length with a groove or channel $f^5$ of the length of the opening $g'$, made between the periphery of the roller $f$ and the fixed bar $g$, so that on the said groove or sunken channel coming opposite the edge of the fixed bar $g$ the larger pills are allowed to fall onto the curved inside of the flap $y$, down which said larger pills roll and onto and rest over the gap $l$.

The flap $y$, which is double-armed, turns upon a shaft or axis $y^2$, and is also provided with a counterpoised weight $y^3$, which has the constant tendency to keep the flap up to and against the periphery of the roller, as shown in the enlarged view, Fig. 11, of which Fig. 12 is a side elevation. Rigid with the flap or its axis or shaft is a tappet $y^4$, (shown in dotted lines,) operated or moved outwardly by a pin $z^2$, standing out from the face of a grooved driving-pulley $z$, which revolves with the roller $f$. Thus on pills having been thrown by the feeder, as aforesaid, onto or above the opening $g'$, just after the channel sunken within the roller has passed the edge of the fixed bar in the direction as indicated by the arrow, the small pills continue to fall through the said long opening $g'$ and down behind the flap $y$, which now has its edge resting against the roller, as shown in the said enlarged view, Fig. 11. The said roller, continuing to revolve, brings the pin $z^2$ against the tappet $y^4$, which moves the flap back to the position as shown in Fig. 3, when the groove in the roller having come opposite the fixed edge, as shown in the said Fig. 3, the larger-sized pills, resting on and over the opening, fall through onto the inside of the flap and are then by its incline rolled forward on the bar $l'$, and from thence onto a second gap $l$, Fig. 3, the feeder $d$ meanwhile delivering the next row of pills from the chute $c$ over to the opening or space $g'$ between the periphery of the roller $f$ and the edge of the fixed bar $g$. As soon as this has taken place, the pin $z^2$, passing off the tappet $y^2$, allows the flap $y$ to fall against the roller $f$ again.

The space or opening $l$, the width of which is adjustable, is formed between the fixed bar $l'$ and the adjustable bar $l^2$, each of which has its bearings in the sides of the frame-work, the bar $l^2$ being adjustable by means of the spring-pressed screw $l^3$. The space $l$ is set of the required width to allow pills of the right size to fall through onto the inclined plane $p$ and to retain on the top by resting on the edges of the two fixed bars pills which are above the required size.

Before another row of pills is fed into the space or opening $l$ these large pills are cleared away by means of the blade $m$ (shown in its highest position in Fig. 3) rising in the space or opening and causing the large pills to roll down the adjustable bar $l^2$ through the chute $l^4$ and down the slope $l^5$ into the box $h^2$, placed to receive them, as well as the small pills. The blade $m$ is secured at each end to a spring-actuated arm $m'$, adjustable by means of the thumb-screw $m^2$, and receives its rising motion by means of the weight $m^4$ or equivalent and its falling motion by means of the cam $e^4$ and tappet-lever $e^2$ actuating the arm $e^3$, carried on the shaft $e^5$ at the end of the cross-bar $e^6$, Figs. 3 and 4. The pills which have fallen through the second opening $l$, although of the required size, may not be perfectly round. They are therefore conveyed through the opening $p'$ in the inclined plane $p$ to a vibrating inclined tray $r$. The tray is suspended by means of the straps $s'$, connected to each end of the two beams $s$, fixed on the horizontal shaft $r'$, supported at each end by a standard $q$, bolted to the wood bed $w$. Fixed to the shaft $r'$ is an arm $r^2$, carrying at its lower end a set-screw $r^3$, which can be tightened in the slot $r^4$ to keep the tray $r$ at any required angle.

A lateral vibrating motion is imparted to the tray $r$ while the pills are descending by the following means: On the end of the shaft $b$ is a grooved pulley $t$, communicating motion by means of a rope or equivalent to a similar pulley $t'$, mounted on one end of the shaft $t^2$, supported in the lower part of the frame-work $a'$.

On the opposite end of the shaft $t^2$ and inside the frame-work $a'$ is a disk $t^3$, connected by means of the pin $t^4$ and rod $t^5$ to the horizontal lever $t^6$, working on the shaft $u$. On the opposite end of this shaft is a vertical lever $t^7$, connected at its upper end by a forked link $v$, Fig. 8, and plate $v'$ to the under side of the tray $r$.

The machine is set in motion by the hand-wheel $b^2$, fixed on the shaft $b$, which carries at its opposite end a grooved pulley $b^3$, imparting motion by means of a rope or equivalent to a similar pulley $b^4$ on the end of the roller-shaft $f^2$, and the operation of the machine is as follows: The pills or other similar spherical or globular bodies to be sorted are placed on the vibrating inclined chute $c$, which delivers them onto the ledge $d^2$ of the alternating or rising and falling feeder-bar $d'$. This feeder having risen to its highest position, the pills roll into the space or opening $g'$, formed between the fixed bar $g$ and the revolving adjustable roller $f$ just as the channel $f^5$ has passed the fixed edge of the bar $g$, and the roller $f$, continuing to revolve, keeps the pills moving in the opening, the object of the rolling being to find any pills having a smaller diameter than the width of the opening, when they will fall through into the receptacle below.

The channel $f^5$ in the roller $f$, having made a complete revolution, arrives, as aforesaid, before the fixed edge of the bar $g$, when the pills remaining in the opening $g'$ fall through and are from thence conducted onto the second opening $l$, formed between the fixed and adjustable bars $l'$ and $l^2$, which allows only pills of the right size to fall through, and retains on the top all which are too large. The blade $m$, then rising between the bars $l'$ and $l^2$, lifts and delivers the large pills onto the chute $l^4$ and inclined plane $l^5$ into the box $h^2$, Fig. 1. The pills of the required size, having fallen onto the incline plane $p$, roll down and pass through an opening $p'$ near the bottom onto the inclined vibrating tray $r$, when those of practically perfect uniformity of shape and size—that is, the round pills—on reaching the bottom will have acquired sufficient momentum to carry them over the adjustable edge $r^5$ into a suitable receptacle X; but those of imperfect shape and size will naturally roll slower, and, not having acquired sufficient momentum to carry them over this edge, they will fall between it and the end of the inclined tray into a box X' below. The lateral vibration is imparted to the inclined tray during the descent of the pills in order to find any dents or flat places in them, and thereby cause them to roll slower.

The means for sorting may be briefly described as follows: The first means (the adjustable revolving roller $f$ and fixed edge $g$) takes out the small pills, the second means (the two fixed edges $l'$ and $l^2$) removes the large pills, and the third means (the vibrating inclined tray $r$) separates the irregularly-shaped pills from the perfect ones.

Having thus described our invention, we claim as new and desire to secure by Letters Patent—

1. In a machine for sorting pills and the like, the combination of a roller $f$, having groove or channel $f^5$, with a fixed bar $g$, the roller and bar being adjustable in relation to each other, a tilting feeder $d'$, and an inclined vibrating chute, substantially as and for the purpose as described and illustrated.

2. In a machine for assorting pills and the like, the combination, with the bars $l'\ l^2$, the vertically-reciprocating blade $m$, rising between said bars, and the inclined plane $p$, of the inclined vibrating tray $r$, suspended below the end of the inclined plane $p$, substantially as shown and described.

In testimony that we claim the foregoing we have hereunto set our hands this 27th day of October, 1888.

WILLIAM SAMMONS HUBBARD.
RICHARD GIBBINS.

Witnesses:
    JOS. B. HAXBY,
*Solicitor to U. S. C. Agent, Leicester.*
    J. B. WARING,
        *His clerk.*